No. 835,345. PATENTED NOV. 6, 1906.
G. J. BABCOCK.
SHEARS.
APPLICATION FILED DEC. 30, 1905.

UNITED STATES PATENT OFFICE.

GEORGE J. BABCOCK, OF WATERBURY, CONNECTICUT.

SHEARS.

No. 835,345.        Specification of Letters Patent.        Patented Nov. 6, 1906.

Application filed December 30, 1905. Serial No. 293,944.

*To all whom it may concern:*

Be it known that I, GEORGE J. BABCOCK, a citizen of the United States, residing at Waterbury, in the county of New Haven and State of Connecticut, have invented certain new and useful Improvements in Shears, of which the following is a specification, reference being had therein to the accompanying drawings.

My invention relates to new and useful improvements in shears, and has for its object, among other things, to provide improved means for pivotally connecting the two blades, whereby they may be held in proper relation to each other without becoming unloosened through use and to accomplish this result with the minimum cost.

To these and other ends my invention consists in the shears having certain details of construction and combinations of parts, as will be hereinafter described, and more particularly pointed out in the claims.

Figure 1:
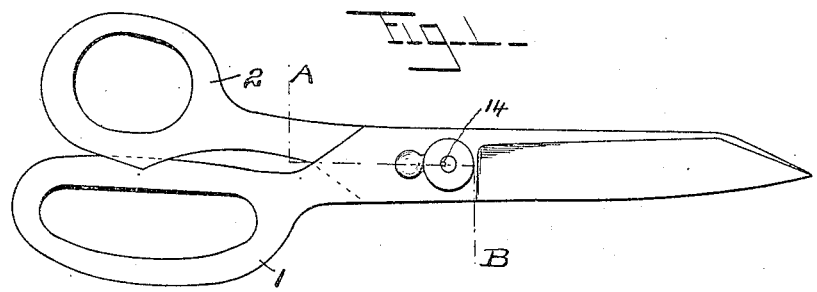
Figure 3:
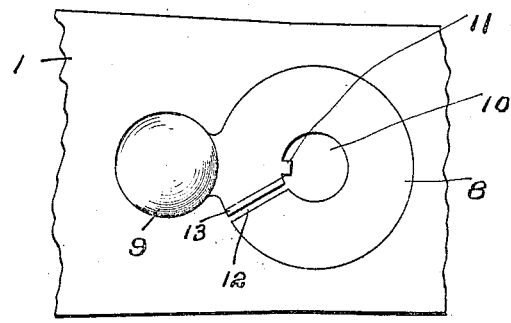
Figure 2:
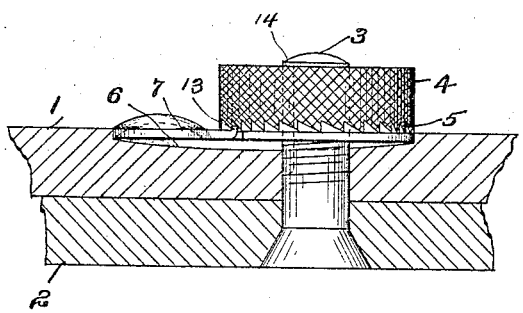

Referring to the drawings, in which like numerals of reference designate like parts in the several figures, Figure 1 is a view of a pair of shears embodying my improvements. Fig. 2 is an enlarged longitudinal section of a portion of the blade upon line A B of Fig. 1; and Fig. 3 is an enlarged plan view of one of the blades, showing the locking-plate in operative position.

In the practice of my invention I provide two blades (severally designated 1 and 2) of the usual construction. Through these blades is a bolt 3, upon which is a knurled thumb-nut 4, having a plurality of radial teeth 5 upon its under side.

In one side of the blade 1 is a recess 6, having a concaved bottom and within which lies a spring-plate 7, formed with a head portion 8 and a cupped finger portion 9. Through the head portion 8 is an aperture 10 of substantially the same diameter as the bolt 3, which is prevented from rotating therein by the lug 11, which projects into the groove 14. The head portion is split radially at 12, with one edge thereof turned upwardly to form the tooth 13.

I prefer to use the lug 11 to prevent the rotation of the pintle; but it is obvious that any one of many other means to accomplish this result may be used equally as well, and hence do not limit myself to the construction herein shown.

In its normal position the spring-plate 7 lies within the recess 6, supported at either end, as shown in Fig. 2, with the tooth 13 thereon in engagement with one of the teeth 5 upon the inside of the nut 4, which is thereby held against rotation. To take off the nut, it is simply necessary to place the thumb upon the finger portion 9 of the spring-plate and depress the same between its ends, which action will disengage the tooth 13 from the teeth 5, thereby permitting the nut to be rotated as desired, the lug 11 by its engagement with the groove 14 preventing the rotation of the screw 3.

There are minor changes and alterations that can be made within my invention, and I would, therefore, have it understood that I do not limit myself to the exact construction herein shown and described, but claim all that falls fairly within the spirit and scope of my invention.

Having described my invention, what I claim as new, and desire to secure by Letters Patent, is—

1. In a pair of shears, the combination with two blades having pintle-openings therethrough, one of said blades having a recess in one side thereof concentric with the pintle-opening therethrough; a spring-plate within said recess; a pintle connection between said blades within said pintle-openings; and a nut threaded upon said pintle and having a plurality of radial teeth upon one end thereof rotatable in the path of a tooth upon said spring-plate concealed beneath said nut.

2. In a pair of shears, the combination with two blades having pintle-openings therethrough; of a pintle connection between said blades; a toothed nut upon said pintle connection; a spring-plate connected with one of said blades having an operative engagement with said pintle connection and holding the same against rotation and having a toothed engagement with said nut.

3. In a pair of shears, the combination with the two blades, one of which has a recess in one side thereof with a concaved bottom; a pintle connecting said blades; a toothed nut threaded on said pintle; and a spring-plate lying within said recess supported at both ends by the bottom thereof and projecting radially beyond the periphery of said nut and having a toothed engagement therewith.

4. In a pair of shears, the combination with two blades having pintle-openings therethrough, one of said blades having a recess in one side thereof with a concaved bottom, said recess being in part concentric with said pintle-openings and in part upon one side thereof; a pintle connecting said blades; a toothed nut threaded thereon; a spring-plate lying within said recess, held against rotation thereby and supported at both ends by the bottom thereof, having engagement with said pintle so as to prevent its rotation within said blades, and having a tooth thereon which engages with said toothed nut.

5. In a pair of shears, the combination with two blades; of a pintle for connecting said blades; a toothed nut threaded thereon; a spring-plate lying in a recess in one of said blades and held against rotation thereby, said spring-plate having a head portion provided with a projecting tooth which engages the teeth on said nut; and a laterally-projecting finger portion adjacent to said head portion.

6. In a pair of shears, the combination with two blades; of a pintle for connecting said blades; a nut threaded thereon; a spring-plate connected with one of said blades and engaging said pintle so as to prevent its rotation, said spring-plate having a head portion provided with a projecting tooth; and a finger portion adjacent to said head portion.

In testimony whereof I affix my signature in presence of two witnesses.

GEORGE J. BABCOCK.

Witnesses:
GEORGE E. HALL,
OTIS L. FULLER.